US012793320B2

(12) United States Patent
Faustino

(10) Patent No.: US 12,793,320 B2
(45) **Date of Patent: *Nov. 10, 2026**

(54) TRANSFORMING A THREE-DIMENSIONAL VIRTUAL MODEL TO A MANIPULATABLE FORMAT

(71) Applicant: DG HOLDINGS, INC., Salt Lake City, UT (US)

(72) Inventor: Joshua Faustino, Cottonwood Heights, UT (US)

(73) Assignee: DG Holdings, Inc., Salt Lake City, UT (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/677,274

(22) Filed: May 29, 2024

(65) Prior Publication Data

US 2024/0428501 A1 Dec. 26, 2024

Related U.S. Application Data

(63) Continuation of application No. 17/866,359, filed on Jul. 15, 2022, now Pat. No. 12,020,365, which is a continuation of application No. 17/244,643, filed on Apr. 29, 2021, now Pat. No. 11,423,601.

(51) Int. Cl.

| | |
|---|---|
| ***G06T 15/04*** | (2011.01) |
| ***G06T 11/10*** | (2026.01) |
| ***G06T 15/08*** | (2011.01) |
| ***G06T 17/10*** | (2006.01) |
| ***G06T 17/20*** | (2006.01) |
| ***G06T 19/20*** | (2011.01) |

(52) U.S. Cl.

CPC .............. *G06T 15/04* (2013.01); *G06T 11/10* (2026.01); *G06T 15/08* (2013.01); *G06T 17/10* (2013.01); *G06T 17/20* (2013.01); *G06T 19/20* (2013.01); *G06T 2219/2021* (2013.01)

(58) Field of Classification Search

CPC ......... G06T 15/04; G06T 11/10; G06T 15/08; G06T 17/10; G06T 17/20; G06T 19/20; G06T 2219/2021; G06T 17/30

See application file for complete search history.

(56) References Cited

U.S. PATENT DOCUMENTS

| | | | | |
|---|---|---|---|---|
| 9,697,635 | B2 * | 7/2017 | Quinn | A63F 13/213 |
| 11,423,601 | B1 | 8/2022 | Faustino | |
| 11,423,643 | B1 | 8/2022 | Jeong | |

(Continued)

OTHER PUBLICATIONS

Onizuka, Hayato, et al. "Landmark-Guided Deformation Transfer of Template Facial Expressions for Automatic Generation of Avatar Blendshapes." 2019 IEEE/CVF International Conference on Computer Vision Workshop (ICCVW). IEEE, 2019. (Year: 2019).

*Primary Examiner* — Said Broome
*Assistant Examiner* — Denis Vasiliy Minko
(74) *Attorney, Agent, or Firm* — Foley & Lardner LLP

(57) ABSTRACT

A three-dimensional (3D) content refactoring system may maintain the external look and behavior of a donor model, while changing the underlying data to conform the donor model to content standards of a modeling application. The 3D content refactoring system may make the donor model adhere to the content standards by mapping the donor model to a target model that is already formatted for the modeling application.

20 Claims, 8 Drawing Sheets

(56) References Cited

U.S. PATENT DOCUMENTS

| | | | | |
|---|---|---|---|---|
| 2008/0024511 | A1* | 1/2008 | Biehn | G06T 15/50 345/473 |
| 2018/0033189 | A1* | 2/2018 | Ma | G06V 40/174 |
| 2018/0122148 | A1* | 5/2018 | Janzer | G06T 15/503 |
| 2019/0266796 | A1* | 8/2019 | Comer | F01N 13/004 |
| 2019/0266806 | A1 | 8/2019 | Aluru et al. | |
| 2019/0362551 | A1 | 11/2019 | Sheffield et al. | |
| 2020/0082572 | A1* | 3/2020 | Beeler | G06T 15/506 |
| 2020/0184714 | A1* | 6/2020 | Guo | G06T 15/50 |
| 2020/0184721 | A1* | 6/2020 | Ge | G06T 7/50 |
| 2020/0358983 | A1* | 11/2020 | Astarabadi | H04N 7/157 |
| 2021/0065420 | A1 | 3/2021 | Orvalho et al. | |
| 2021/0158591 | A1* | 5/2021 | Kuribayashi | G06T 17/20 |

* cited by examiner

TRANSFORMING A THREE-DIMENSIONAL VIRTUAL MODEL TO A MANIPULATABLE FORMAT

RELATED APPLICATIONS

This application is a continuation of U.S. patent application Ser. No. 17/866,359, filed Jul. 15, 2022, and titled TRANSFORMING A THREE-DIMENSIONAL VIRTUAL MODEL TO A MANIPULATABLE FORMAT, which is a continuation of U.S. patent application Ser. No. 17/244,643, filed Apr. 29, 2021, and titled TRANSFORMING A THREE-DIMENSIONAL VIRTUAL MODEL TO A MANIPULATABLE FORMAT, each of which is incorporated herein by reference in its entirety.

TECHNICAL FIELD

The present disclosure relates to electronic or other virtual representations of an individual or entity in a computer generated environment. In particular, the present disclosure relates to systems, apparatuses, and methods for generating a new three-dimensional (3D) virtual model that adheres to specifications of a target three-dimensional avatar system and that is visually identical to an already existing original 3D virtual model that does not adhere to specifications of the target three-dimensional avatar system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
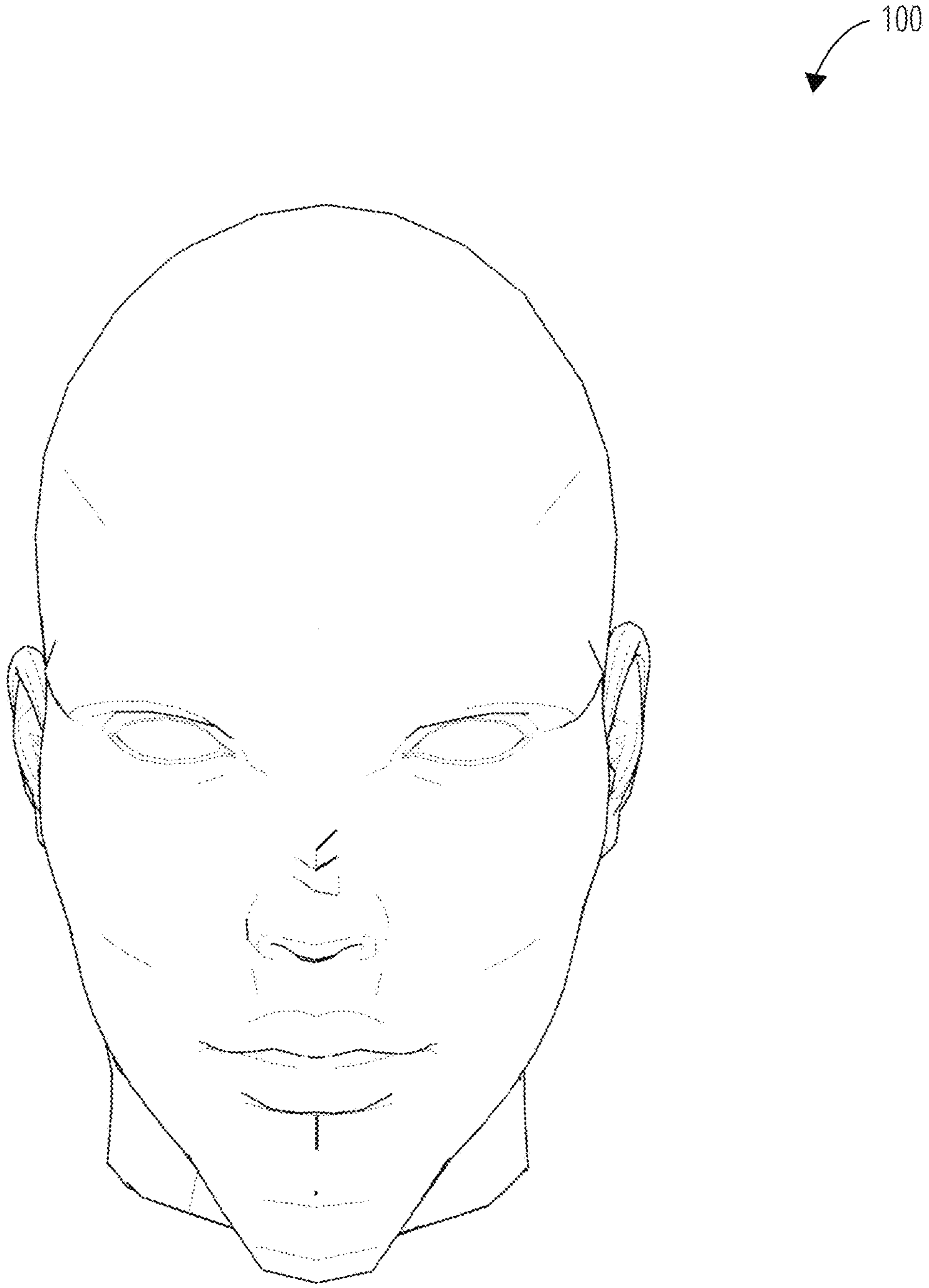
FIG. 1 illustrates a donor model in accordance with one embodiment.

Three-dimensional (3D) modeling, scene creation, and rendering applications (3D modeling applications) may be used to produce images, video, and games. The 3D modeling applications may use a variety of 3D assets to create these images, video, and games. The 3D assets include items that may be manipulated (e.g., alter pose, location, size, etc.) such as avatars, clothing, items, and animals.

To be manipulatable within a 3D modeling application, the 3D assets generally should follow a specific content standard. The content standard may include specific rules or specifications for a 3D asset. For example, the content standard may include specific rules for different aspects of a 3D asset such as meshes, blendshapes, UV and texture mapping, and rigging. In some embodiments, the content standard may even define specific rules for a base asset (e.g., an avatar) and a following asset (e.g., clothing or items used by an avatar).

In some embodiments, the 3D modeling application may include ready-to-use 3D assets and a design studio to generate 3D assets that adheres to the content standard. However, a user may desire to use a 3D asset that was created outside of the 3D modeling application and does not adhere to the content standard. This non-compliant 3D asset would not be manipulatable in the 3D modeling application because the non-compliant 3D asset does not adhere to the content standard.

To use such a non-compliant 3D asset, typically the non-compliant 3D asset would be manually drawn specifically for the 3D modeling application and associated content standard. The 3D modeling application would then be capable of manipulating the manually drawn 3D asset. In other words, an artist would manually recreate a 3D model into the correct format for the software suite.

Embodiments herein provide methods, systems, and apparatuses to import (or simply refactor) non-compliant 3D assets into a 3D modeling application. In some embodiments, the methods, systems, and apparatuses create a new 3D asset ("new 3D model") that is visually identical to an already existing non-compliant original 3D asset ("original 3D model"), where the visually identical new 3D model is generated to adhere to specifications of a target 3D modeling application, and where the original 3D model does not adhere to specifications of the target 3D modeling application.

Generating or creating a visually identical new 3D model that adheres to the specifications of the target 3D modeling application may be referred to as refactoring. Refactoring in this sense refers to maintaining the external look and behavior (e.g., how it bends and animates) of the original 3D model, but the underlying things that make the visually identical new 3D model work (e.g., the topology, rig, skin weights, UVs, textures, etc.) are all different than the original 3D model and the underlying data changes to conform to the target 3D modeling application. The underlying things include internal 3D data (also referred to as underlying data) that is used by the target 3D modeling application to manipulate the 3D model. In other words the externals of the original 3D model may be used to control how the end result looks such that the resulting visually identical 3D virtual model is practically identical visually to the original 3D model, even though the internal 3D data is fundamentally changed to function with the target 3D modeling application.

In some embodiments, the original 3D model (e.g., a source model or donor model) is obtained or otherwise received (e.g., imported) and is refactored by mapping the original 3D model to a target model previously designed for the 3D modeling application and the associated content standard. The process is described below and is also shown by the attached images.

A 3D asset refers to a computer-generated 3D virtual model of something such as an item, person, animal, character, etc. A 3D asset may include a mesh that defines a collection of vertices, edges, and faces that define the shape of the model. The 3D asset may further include topology, rig/bone structure, skin weights, UV map, and textures.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods or components. Further, in some cases, well-known structures, or operations are not shown or described in detail in order to avoid obscuring aspects of the embodiments. Furthermore, the described features, structures, or characteristics may be combined in any suitable manner in one or more embodiments.

FIGS. 1-5 illustrate various stages of refactoring an original non-compliant 3D asset (i.e., donor model 100) using a 3D content refactoring system. In this process a new 3D asset is generated that looks like the non-compliant 3D asset and is compliant with a target 3D modeling standard such that it is manipulatable by a target 3D modeling application. The refactoring process uses or otherwise involves two models (e.g., donor model 100 of FIG. 1 and target model 200 of FIG. 2).

FIG. 1 illustrates a donor model 100. The donor model 100 is the 3D model that is desired to be refactored in order to use and manipulate the donor model 100 in a target 3D modeling application. The donor model 100 in its original or current form does not adhere to a target 3D modeling standard associated with the target 3D modeling application. For example, the donor model 100 may not comply with rules or requirements of the target 3D modeling standard regarding one or more of topology, rig/bone structure, skin weights, mapping, UV map, and textures.

In some embodiments, the donor model 100 may lack information for animation. For example, the donor model 100 may include a high poly geometry, textures, UV meshes, and other information regarding appearance but lack in underlying components that describe behavior such as how the donor model 100 bends and animates.

The 3D content refactoring system may receive and store the donor model 100. For example, the donor model 100 may be uploaded to the 3D content refactoring system from a storage device, wirelessly or via a wired connection. The donor model 100 may be a 3D image captured by an imaging system or a file from a disparate 3D modeling application (i.e., disparate relative to the target 3D modeling application). For example, the donor model 100 may be an image from another modeling program (e.g., a source modeling program different from the target 3D modeling application) or a 3D capture (e.g., scan) of a person that has been captured, imported, or otherwise received. To refactor the donor model 100 into the target 3D modeling application such that the donor model 100 may be manipulated by the software, the refactoring process may merge the target model and the donor model using the processes described with reference to the following figures.

In the illustrated embodiment, the donor model 100 is a model of a person. While only a head is shown, the process used to refactor the donor model 100 may be used to refactor a model of an entire person (e.g., head and body), an animal, or item. In some embodiments, the 3D content refactoring system may be used to generate a computerized avatar that appears like a user and is capable of being manipulated by the target 3D modeling application. For example, a person may capture a 3D scan of themselves and use the 3D content refactoring system to generate a model that appears like the person and is manipulatable within the target 3D modeling application. The target 3D modeling application may use the generated model (or the generated model may be used) to create scenes, movies, music videos, games, applications, and other media.

Figure 2:
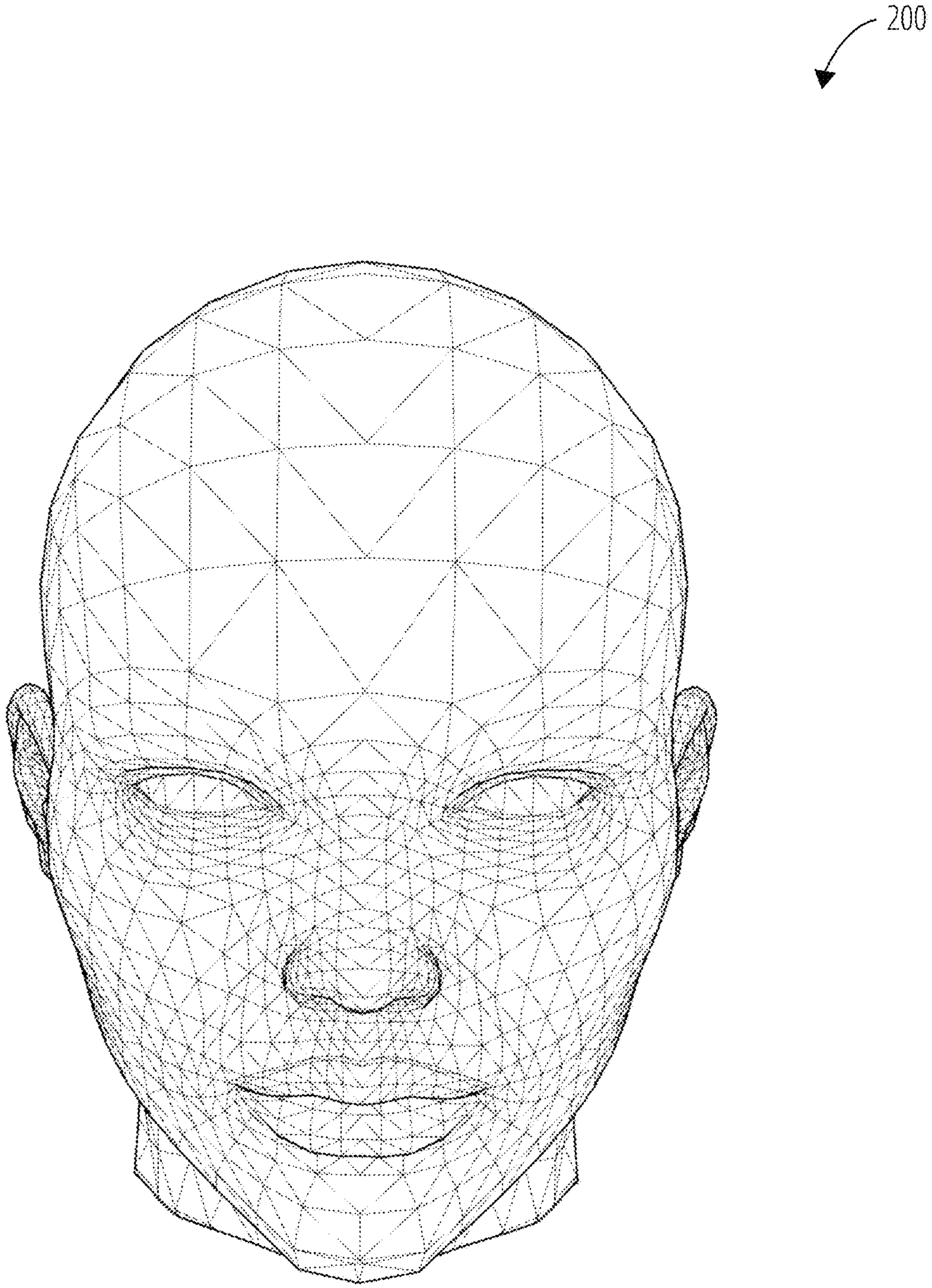
FIG. 2 illustrates a target model in accordance with one embodiment.

FIG. 2 illustrates a target model 200. The target model 200 is a model that is formatted or otherwise configured to be manipulated by the target 3D modeling application. The target model may include geometry, bones, weights, UV, textures, etc. In some embodiments, the target model 200 may be a rigged bipedal model. In some embodiments, the target model 200 is symmetrical. The target model 200 may be created by the target 3D modeling application, or the target model 200 may be obtained from a separate application or source.

As will be explained in more detail with the following figures, the 3D content refactoring system may use the donor model 100 as a template to alter a shape of the target model 200 to generate a new model from the target model 200 that resembles the donor model 100. In other words, the 3D content refactoring system may create an altered version of the target model 200 that resembles the donor model 100 while retaining the underlying data to conform to the target 3D modeling application (e.g., base model, rig, weights, UVs, etc.).

In some embodiments, the 3D content refactoring system may identify the target model 200 from a plurality of compliant models based on similarities between the target model 200 and the donor model 100. The compliant models may be a collection of models that are compliant to the content standard associated with the target 3D modeling application. The 3D content refactoring system may identify the target model 200 by comparing each of the compliant models to the donor model 100 and selecting the model that is the most similar. For example, the 3D content refactoring system may compare one or more of overall shape of the model, features on the model (e.g., eyes, cars, fingers), location of vertices, etc.

In some embodiments, the 3D content refactoring system may optimize the target model 200 for the refactoring process by removing detailed structures from the mesh of the target model 200. For example, the 3D content refactoring system may remove teeth, tongue, and eyes from the mesh of the target model 200. This will retain the vertices of the mesh responsible for the overall shape of the target model 200 while simplifying the mesh to increase computational speeds and using less computational resources during the refactoring process. Thus, the 3D content refactoring system may prepare the target model 200 to merge with the donor model 100 by optimizing the target model 200.

Figure 3:
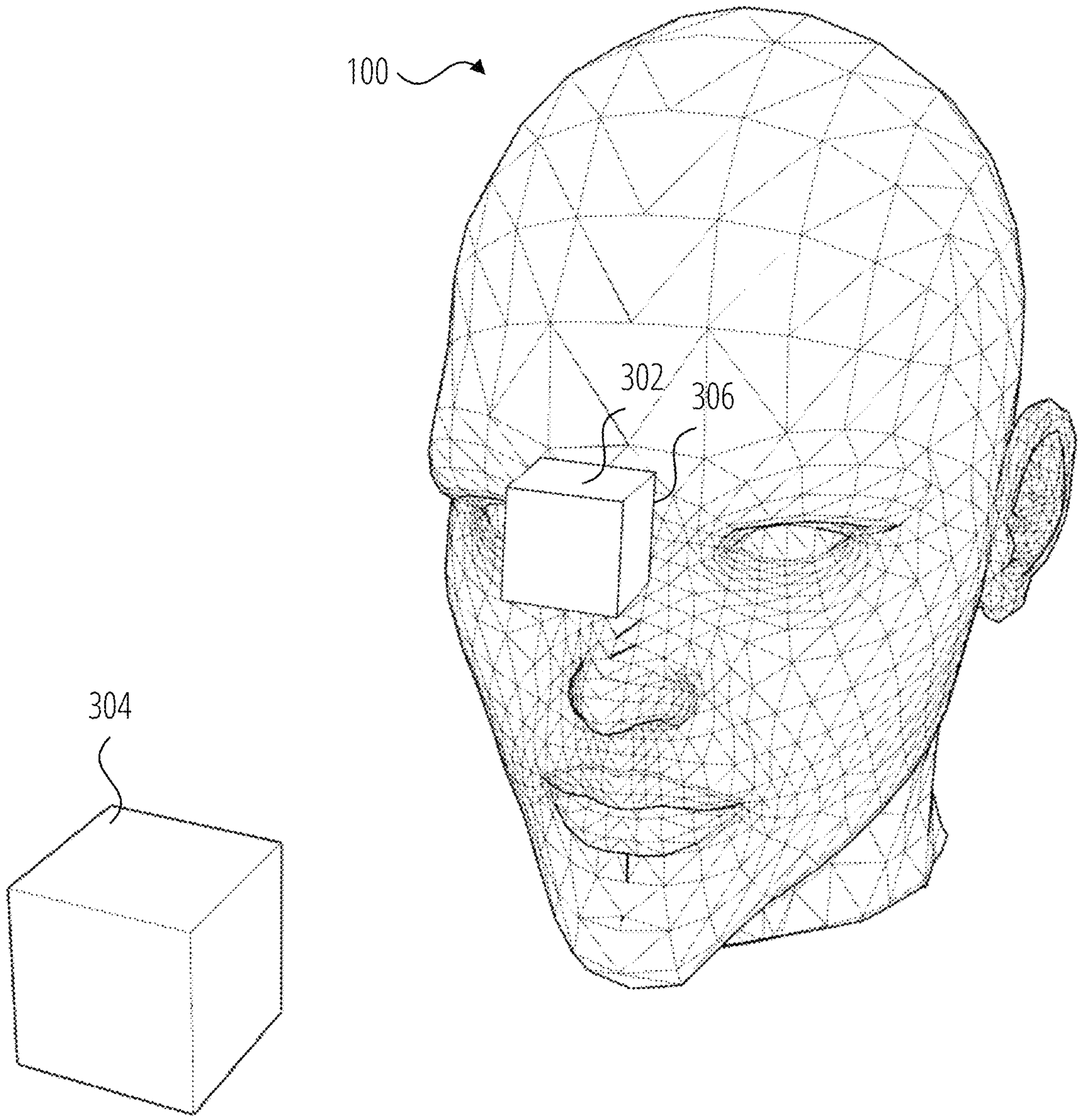
FIG. 3 illustrates a preparation stage of a refactoring process in accordance with one embodiment.

FIG. 3 illustrates a preparation stage of the refactoring process for the donor model 100. In the preparation stage, the 3D content refactoring system may alter the positioning aspects of the donor model 100 such that the donor model 100 better matches with positioning aspects of the target model 200. For example, the 3D content refactoring system may change one or more of the donor model's 100 scale, position, and pose to better match the overall height and position of the target model 200. In some embodiments, the 3D content refactoring system may instead or in addition alter the scale, position, and pose of the target model 200 to better match those of the donor model 100.

Because the donor model 100 is received from an external source, there is no guarantee that the donor model 100 is symmetrical or is positioned at an angle. The 3D content refactoring system may perform an alignment to the donor model 100 to minimize the effects of asymmetries or angled positioning relative to the target model 200.

In some embodiments, the 3D content refactoring system may record the positioning of the donor model 100 before alignment and use the recorded position to perform a realignment after the donor model 100 is refactored, in order to return the donor model 100 to the original position. In some embodiments, the 3D content refactoring system may use two cubes (i.e., first cube 302 and second cube 304) to track the positional changes to the donor model 100. The first cube 302 is aligned to a surface 306 normal the mesh of the donor model 100 and the second cube 304 is used as a guide. Both cubes may be positioned at a similar orientation before the donor model 100 is moved. As the 3D content refactoring system moves the donor model 100, the first cube 302 follows while the second cube 304 is left unrated and in the original position. To return the donor model 100 to the original position, the 3D content refactoring system may use corners of the first cube 302 and the second cube 304 as realignment guides.

Additionally, the 3D content refactoring system may identify requirements from the target model 200. These requirements may include what features the target model 200 has (e.g., clothes, eyelids, finger nails). The 3D content refactoring system may check the donor model 100 to see if the donor model 100 includes these requirements. If the donor model 100 is missing any of these requirements, the 3D content refactoring system may modify the donor model 100 to include the missing requirements to make the donor model 100 more compatible with the target model 200. The 3D content refactoring system may clean, add, or remove elements to make the donor model 100 more compatible with target model 200. The donor model 100 may be compatible with the target model 200 when it includes similar features. Nevertheless, even when the donor model 100 is modified to be compatible with the target model 200, the donor model 100 remains incompatible with the target 3D modeling application because the donor model 100 does not include underlying data to adhere to a target 3D modeling standard associated with the target 3D modeling application (e.g., the donor model 100 may not comply with rules or requirements of the target 3D modeling standard regarding one or more of topology, rig/bone structure, skin weights, UV map, and textures).

Figure 4:
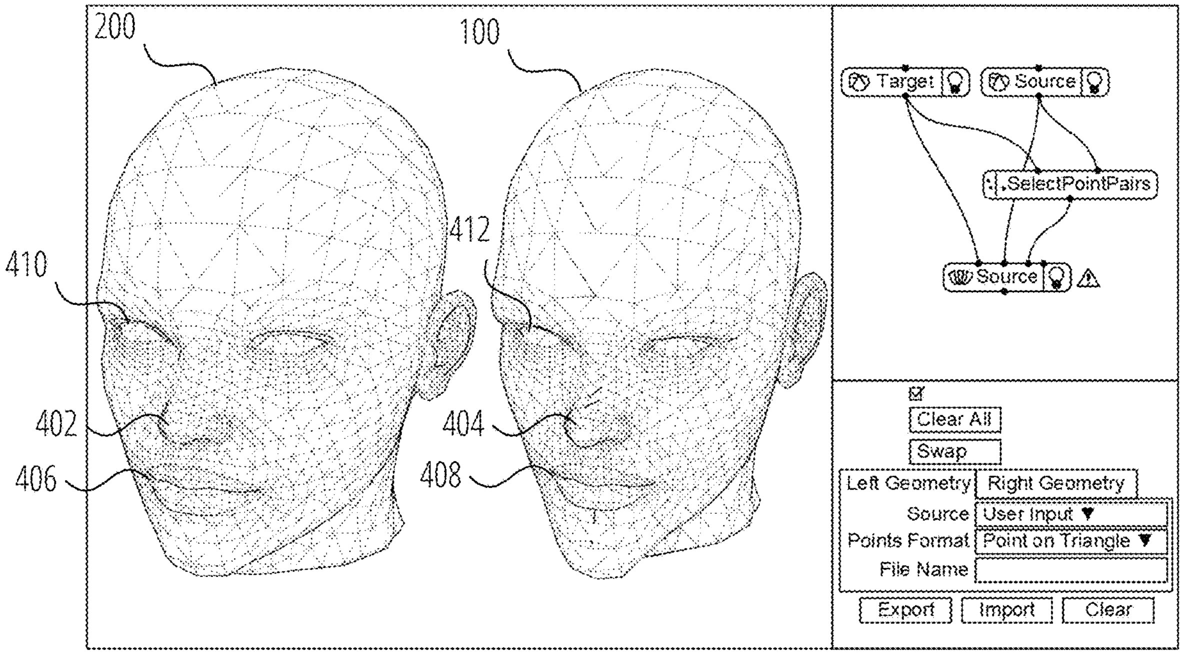
FIG. 4 illustrates a mapping stage of the refactoring process in accordance with one embodiment.

FIG. 4 illustrates a mapping stage of the refactoring process for the donor model 100. In the mapping stage, the 3D content refactoring system may identify and correlate landmarks on the donor model 100 and the target model 200 and create a map between landmarks on the donor model 100 relative to the target model 200 positions.

For example, in some embodiments, the 3D content refactoring system may travel along a pre-defined list of landmarks on the donor model 100 and the target model 200 and identify their locations, shapes, sizes, and vertices. The landmarks may be primarily common areas of distortion (e.g., fingertips, knuckles, chin, nose, cars, eyes, corners of mouth). For example, a nose 404 of the donor model 100 may be identified and a nose 402 of the target model 200 may be identified. Similarly, a corner of the mouth 408 and an eye 412 of the donor model 100 may be identified and a corner of the mouth 406 and an eye 410 of the target model 200 may be identified. This identification process may continue until the landmarks on the pre-defined list are identified. In some embodiments, the landmarks may be user defined inputs. In some embodiments, the 3D content refactoring system identifies the landmarks using UVs, vertices, or faces of the mesh around tips of bones.

Based on point correspondences between the donor model 100 and the target model 200, the 3D content refactoring system may generate a landmark map. The landmark map associates the landmark points of the donor model 100 with the landmark points of the target model 200. The landmark points may be vertices or faces of the meshes that correspond to one or more of fingertips, knuckles, chin, nose, cars, eyes, and corners of mouth. For example, the landmark map may associate the nose 404, the corner of the mouth 408, and the eye 412 of the donor model 100 with the nose 402, the corner of the mouth 406, and the eye 410 of the target model 200.

Figure 5:
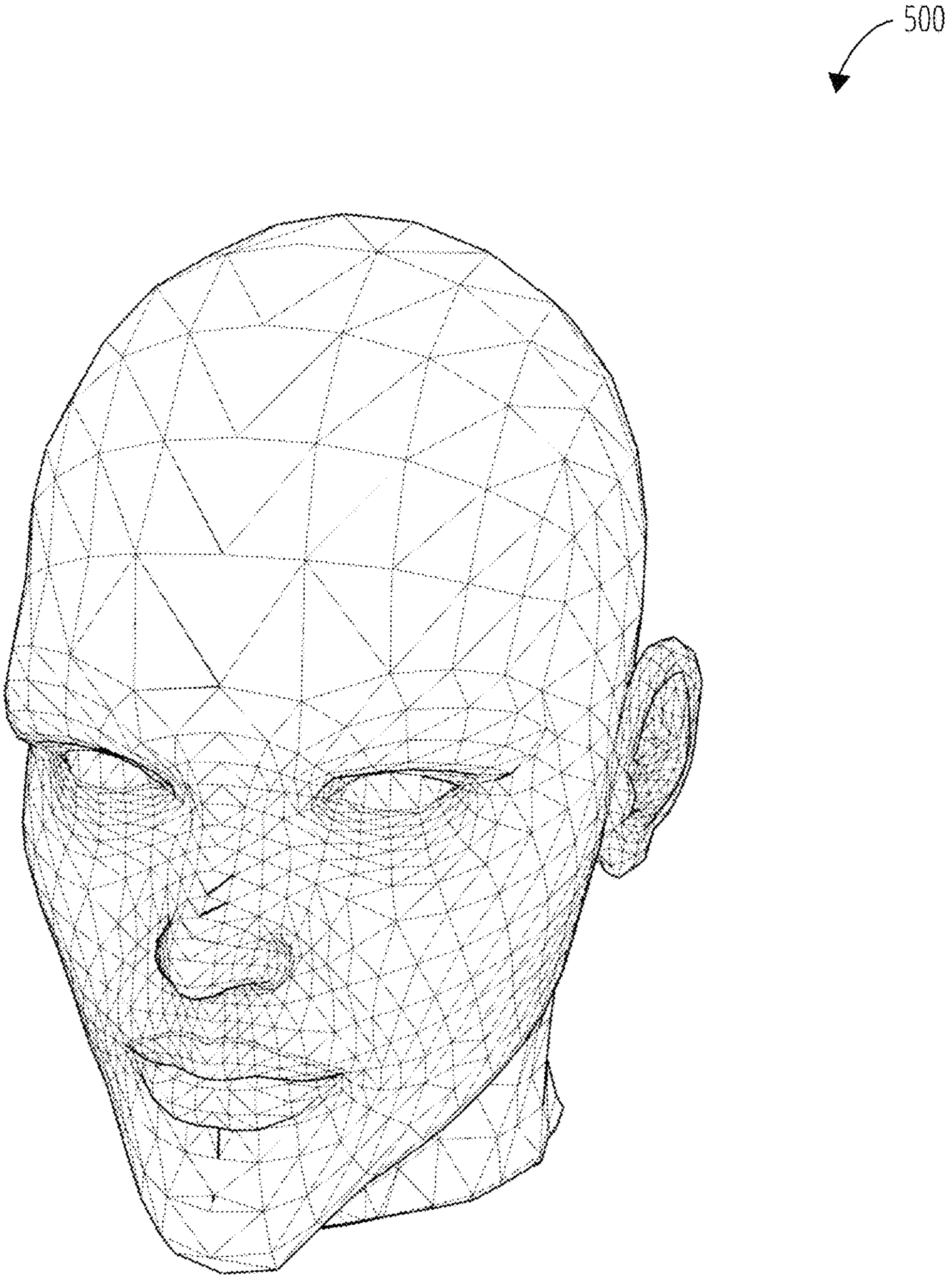
FIG. 5 illustrates an initial wrapping stage of the refactoring process in accordance with one embodiment.

FIG. 5 illustrates an initial wrapping stage of the refactoring process. In the initial wrapping stage, the 3D content refactoring system may clone the geometry of the target model 200 to create a dummy mesh 500. The dummy mesh 500 may be a simplified version of the target model 200 that includes the vertices, edges, and faces that defines the shape of the target model 200 without other features of the target model such as the topology, rig/bone structure, skin weights, and textures.

The 3D content refactoring system may use the landmark map to translate vertices of the dummy mesh 500 from the locations of the target model 200 to the locations of the donor model 100. Thus, the 3D content refactoring system may transform the dummy mesh 500 from the shape of the target model 200 to the shape of the donor model 100. In some embodiments, the 3D content refactoring system may translate the vertices of the dummy mesh 500 by performing point to point movement of landmarks and surrounding vertices according to the landmark map. In other words, the 3D content refactoring system may translate the vertices of the dummy mesh 500 to match the donor model 100 at the landmark points and vertices surrounding the landmarks. In FIG. 5 the dummy mesh 500 is illustrated in the shape of the donor model 100 after the initial wrapping has occurred.

The dummy mesh 500 after the initial wrap may be the approximate shape of the donor model 100. There may be errors on the dummy mesh 500; however, the dummy mesh 500 at this point may be a decent approximation of the donor model 100. In some embodiments, the 3D content refactoring system may perform additional cleaning processes to correct some of the errors in the dummy mesh 500. For example, the 3D content refactoring system may perform a deformation cleaning that addresses issues surrounding the eyelid wells and collapsed vertices. The 3D content refactoring system may perform the corrections using the dummy mesh 500 UVs. At this point the dummy mesh 500 is roughly the same shape as the donor model 100.

Figure 6:
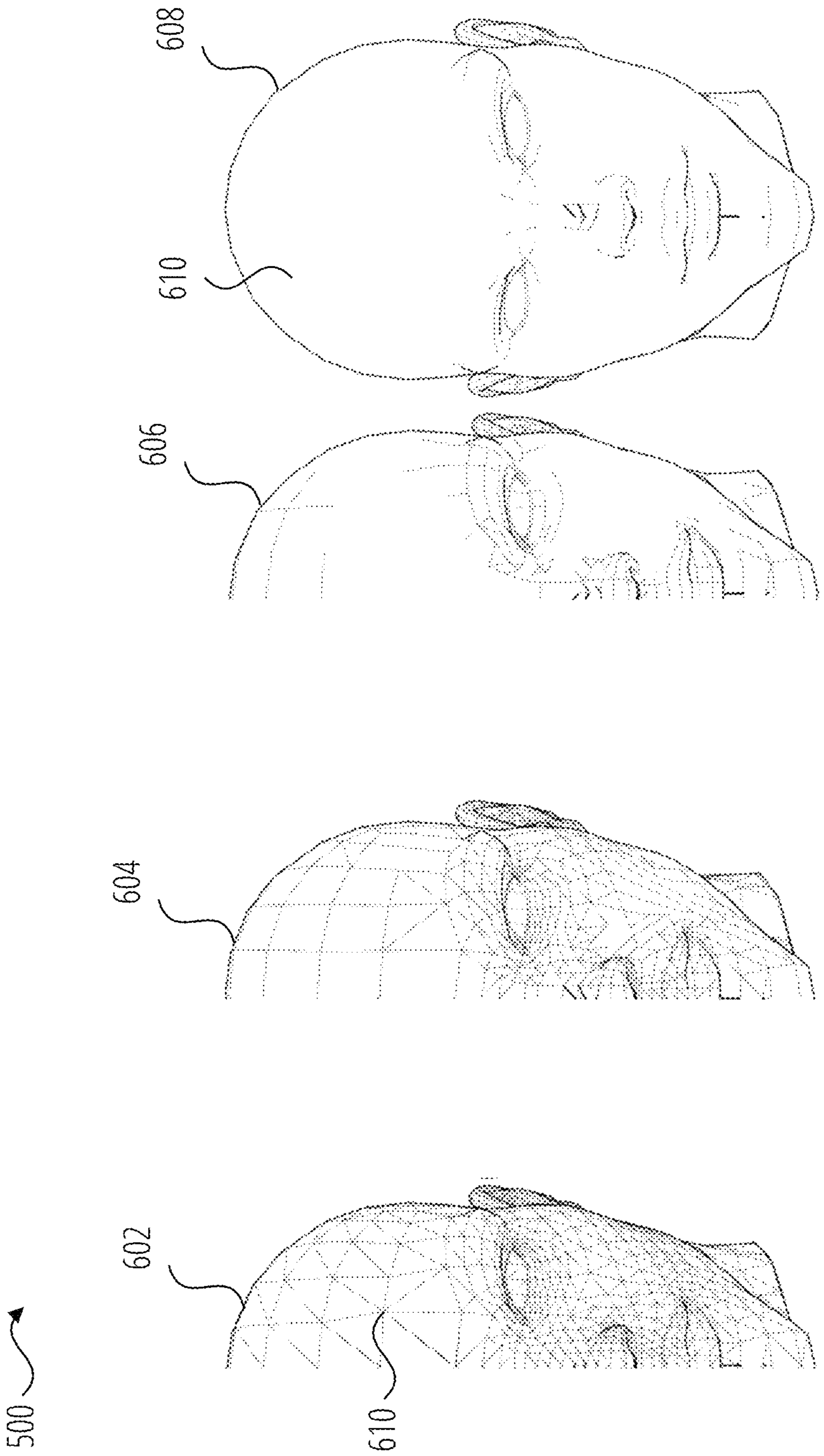
FIG. 6 illustrates a refining stage of the refactoring process in accordance with one embodiment.

FIG. 6 illustrates a refining stage of the refactoring process. To further refine the shape of the dummy mesh 500, the 3D content refactoring system may perform a series of refinement phases (e.g., first phase 602, second phase 604, third phase 606, fourth phase 608). While the illustrated embodiment shows four phases, the refining stage may comprise fewer or more stages.

Each refinement phase cleans up a dummy mesh (e.g., the dummy mesh 500), moving vertices to more accurately match the donor model, smoothing rough spots where unwanted crinkling happens, and making sure that edge loops are in proper places to handle deformation. For example, during the first phase 602, the dummy mesh 500 may include a collection of vertices, edges, and faces that define the dummy mesh 500 in a shape that is close to the shape of the donor model 100. However, the faces, edges, or vertices may not be precisely positioned or shaped correctly. For example, in the first phase 602, the forehead 610 of the dummy mesh 500 is made of a series of large faces and edges that do not completely follow the curvature of the donor model. At each phase, the position and shape of the vertices, faces, and edges are repositioned and/or reshaped to better match the shape of the donor model 100. As illustrated, the edges, vertices, and faces become less and less pronounced or visible at each phase until the forehead 610 in the fourth phase 608 is smooth and rounded, matching the shape of the donor model 100.

To reduce the computational requirements of this refining stage, the 3D content refactoring system may cut the dummy mesh 500 in half vertically. To cut the dummy mesh 500 in half, the 3D content refactoring system may cut along a vertical symmetry line, the geometry, and UVs. Using half of the dummy mesh 500 for further refinement simplifies the process, as the process can more exactly or precisely match the half of the dummy mesh 500 to the donor model 100 without needing to compute the other half of the dummy mesh 500.

At the fourth phase 608, the 3D content refactoring system may mirror along the vertical symmetry line the refined dummy mesh 500 to create a whole mesh. The 3D content refactoring system may virtually weld the geometry and UVs back together to create a whole mesh.

Additionally, in some embodiments, the 3D content refactoring system may modify the vertex order on the mirrored dummy mesh 500 to match the original target model 200. Re-ordering vertices may be done based on proximity in UV space. For example, in some embodiments the 3D content refactoring system may convert the target model 200 and the dummy mesh 500 into flattened meshes in world space and flatten geometry on top of the UVs and create a map (i.e., Pelt Map). The 3D content refactoring system may set a tolerance of matching vertices to a near 0 (zero) value (e.g., 0.0001 space difference or other appropriate tolerance). The 3D content refactoring system may match vertex order of the dummy mesh 500 to match vertex order of the target model 200 based upon which vertexes are at near identical positioning in world space.

The 3D content refactoring system may create a blendshape based off of the dummy mesh 500 vertex positions. The 3D content refactoring system may load the target model 200 and use the blendshape to modify the target model 200 to appear like the donor model 100. For example, the 3D content refactoring system may modify bone positions on the target model 200 with the blendshape from the dummy mesh 500.

The blendshape data may capture position, orientation, and rotation of the offsets of the dummy mesh 500. The 3D content refactoring system may align the donor model 100 with the target model 200 using the blendshape from the dummy mesh 500. The 3D content refactoring system may drive the donor model 100 with the blendshape to align, pose, and position the donor model 100. Additionally, the 3D content refactoring system may project the texture from the donor model 100 to a modified target model to bake the texture to the new UV. Baking is a process of transferring details from one model to another. This modified target model may be referred to as a new model as it appears like the donor model 100 but functions like the target model 200.

The 3D content refactoring system may generate normal maps from the donor model 100 for the new model. If the donor model 100 does not have normal maps, the 3D content refactoring system may bake and generate normal maps for the new model. If the donor model 100 has normal maps, the 3D content refactoring system may translate normal maps from the donor model 100 from tangent space to world space and recalculate the tangent space normal map to the UVs of the new model.

In some embodiments, the 3D content refactoring system may re-introduce asymmetry to the new model if the donor model 100 is asymmetrical. For example, the 3D content refactoring system may identify areas of the donor model 100 that are asymmetrical. The 3D content refactoring system may subdivide the new model to match the donor model 100 polycount/density and project the new model on to the donor model 100 and virtually shrink wrap on the high poly meshes (e.g., new model and donor model 100) to re-add the asymmetry.

Figure 7:
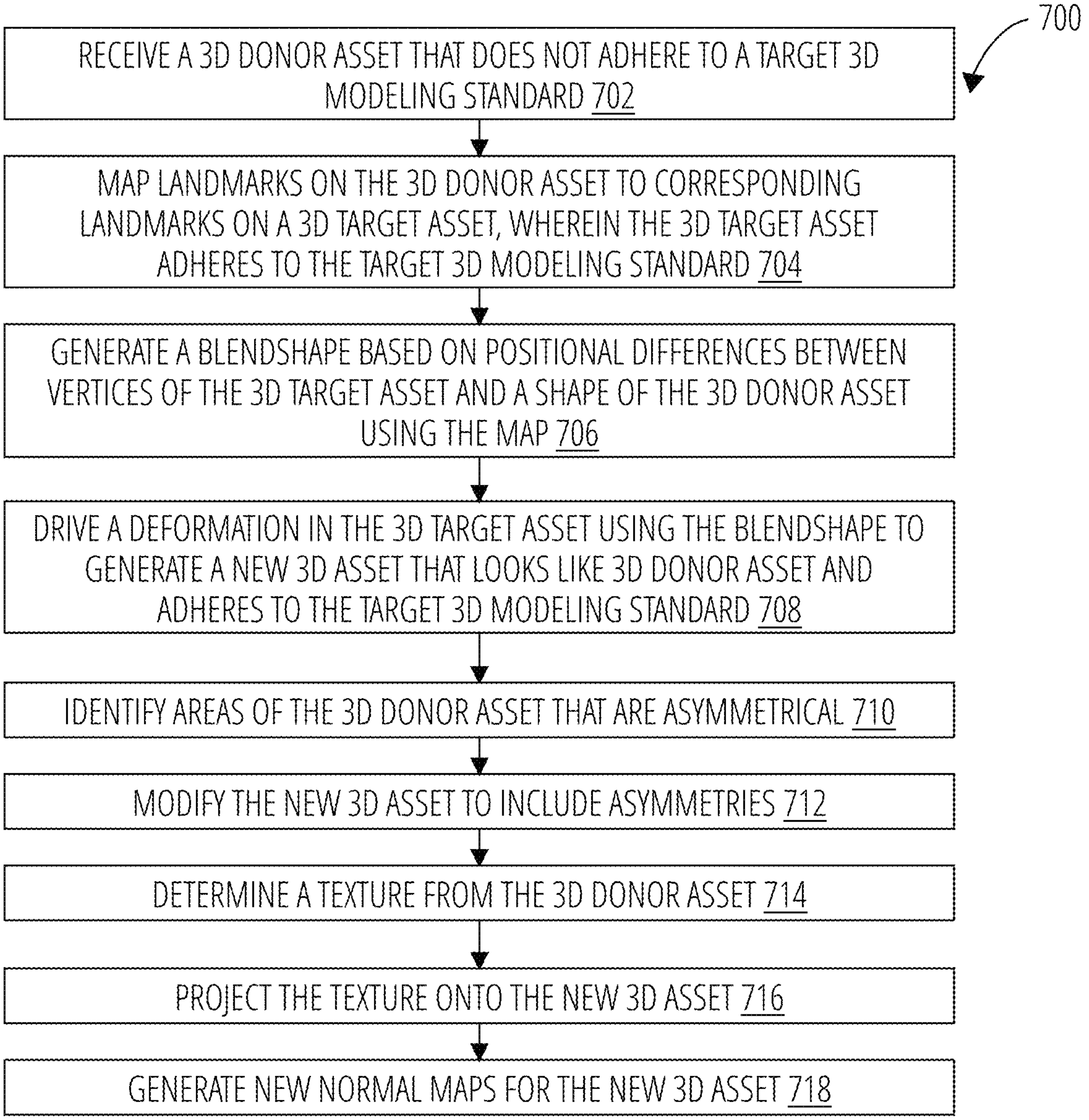
FIG. 7 illustrates a flow diagram of a method for refactoring a 3D model in accordance with one embodiment.

FIG. 7 illustrates a block diagram of a method 700 for refactoring a 3D model, in accordance with some embodiments. In block 702, method 700 receives a 3D donor asset that does not adhere to a target 3D modeling standard. In block 704, method 700 maps landmarks on the 3D donor asset to corresponding landmarks on a 3D target asset. The 3D target asset adheres to the target 3D modeling standard. The landmark mapping may be performed using the embodiments discussed with reference to FIG. 4. For example, a system executing the method 700 may identify the corresponding landmarks based on similar features or anatomical landmarks of the 3D donor asset.

In block 706, method 700 generates a blendshape based on positional differences between vertices of the 3D target asset and a shape of the 3D donor asset using the map of landmarks determined in block 704. The blendshape may be generated using the embodiments discussed with reference to FIG. 6. For example, a system executing the method 700 may generate a clone of the 3D target asset to generate a dummy mesh and translate vertices of the dummy mesh to match the donor mesh at the landmark points and vertices surrounding the landmark points. In some embodiments, the system executing the method 700 may cut the dummy mesh in half vertically, refine a shape of the half of the dummy mesh to more precisely match the 3D donor asset, and mirror the half of the dummy mesh to generate the blendshape.

In block 708, method 700 drives a deformation in the 3D target asset using the blendshape to generate a new 3D asset that looks like the 3D donor asset and adheres to the target 3D modeling standard.

In block 710, method 700 identifies areas of the 3D donor asset that are asymmetrical. In block 712, method 700 modifies the new 3D asset to include asymmetrics. In block 714, method 700 determines a texture from the 3D donor asset. In block 716, method 700 projects the texture onto the new 3D asset.

In block 718, method 700 generates new normal maps for the new 3D asset. When the 3D donor asset comprises donor normal maps, a system executing the method 700 may generate the new normal maps using the donor normal maps as discussed with reference to FIG. 6. If the 3D donor asset does not comprise the donor normal map, a system executing the method 700 may generate the new normal maps by baking the new 3D asset using the 3D donor asset to generate the new normal maps for the new 3D asset.

Figure 8:
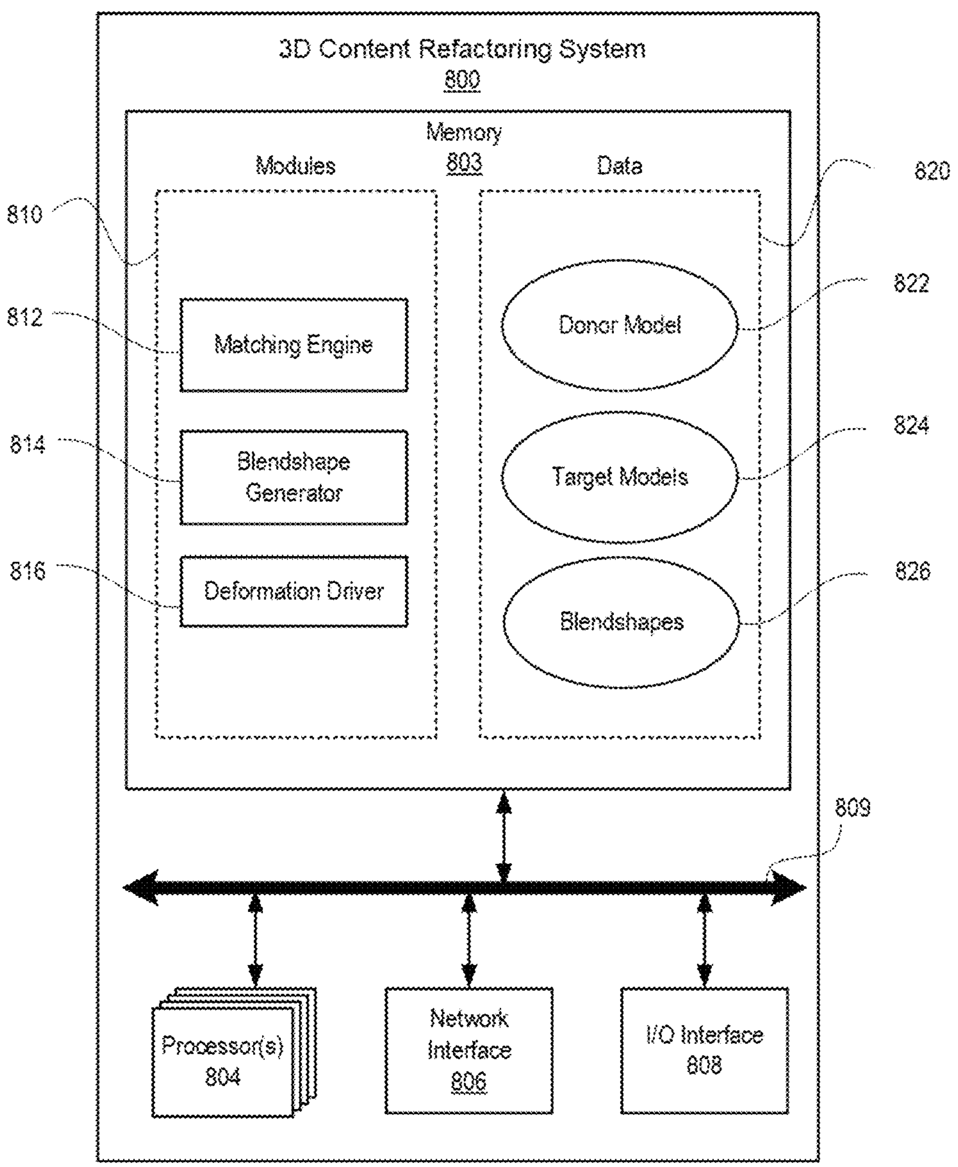
FIG. 8 is a block diagram of a 3D content rendering system in accordance with one embodiment.

FIG. 8 is a block diagram of a 3D content refactoring system 800 according to one embodiment. The 3D content refactoring system 800 may perform the methods and use the techniques described with reference to the other figures in the specification. The 3D content refactoring system 800 can include a memory 803, one or more processors 804, a network interface 806, and an input/output (I/O) interface 808, and a system bus 809.

The one or more processors 804 may include one or more general purpose devices, such as an Intel®, AMD®, or other standard microprocessor. The one or more processors 804 may include a special purpose processing device, such as ASIC, SoC, SiP, FPGA, PAL, PLA, FPLA, PLD, or other customized or programmable device. The one or more processors 804 can perform distributed (e.g., parallel) processing to execute or otherwise implement functionalities of the presently disclosed embodiments. The one or more processors 804 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, or ffiM® OS/2® operating systems, and so forth.

The memory 803 may include static RAM, dynamic RAM, flash memory, one or more flip-flops, ROM, CD-ROM, DVD, disk, tape, or magnetic, optical, or other computer storage medium. The memory 803 may include a plurality of program modules 810 and data 820. The memory 803 may be local to the 3D content refactoring system 800, as shown, or may be distributed and/or remote relative to the 3D content refactoring system 800. Data generated or used by the 3D content refactoring system 800, such as by the program modules 810 or other modules, may be stored on the memory 803, for example, as stored program data 820. The data 820 may be organized as one or more databases.

The data 820 may include a donor model 822, target models 824, and blendshapes 826. The donor model 822 may be a 3D asset that does not comply with a content standard associated with a target modeling application. The target models 824 may be one or more models that are compliant with the content standard. The blendshapes 826 may be produced by the blendshape generator and be used to drive a transformation to cause one of the target models 824 to appear like the donor model 822.

The program modules 810 may include all or portions of other elements of the 3D content rendering system 800. The program modules 810 may run multiple operations concurrently or in parallel by or on the one or more processors 804. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The modules 810 may comprise a matching engine 812, a blendshape generator 814, and a deformation driver 816. The matching engine 812 may determine which of the target models 824 matches most closely to the donor model 822. The blendshape generator 814 may produce a blendshape 826 that may be used by the deformation driver 816 to transform the target model 824 to appear like the donor model 822.

The I/O interface 808 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 806 may facilitate communication with other computing devices and/or networks and/or other computing and/or communications networks. The network interface 806 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 806 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 809 may facilitate communication and/or interaction between the other components of the 3D content rendering system 800, including the one or more processors 804, the memory 803, the I/O interface 808, and the network interface 806.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMS, RAMS, EPROMS, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in the fields of a record in a database across a network.

It will be obvious to those having skill in the art that many changes may be made to the details of the above-described embodiments without departing from the underlying principles of the invention. The scope of the present invention should, therefore, be determined only by the following claims.

What is claimed is:

1. A system to refactor content corresponding to three-dimensional (3D) assets, the system comprising:
- one or more processors and non-transitory memory to:
- deform, using a blendshape that is based at least in part on a landmark map that correlates a first landmark in a donor model to a second landmark in a target model, the target model into a modified target model that adheres to a target 3D modeling standard;
- modify, based on a determination that the donor model is incompatible with a target 3D modeling application corresponding to the target 3D modeling standard, an aspect of the target model to adhere to the target 3D modeling application;
- generate, based on the target model, a dummy mesh having the second landmark; and
- translate, to match the first landmark and vertices surrounding the first landmark, a vertex of the dummy mesh at a location at the target model, the location indicated by the second landmark, the blendshape corresponding to offsets of the dummy mesh.

2. The system of claim 1, wherein the target model is in adherence with the target 3D modeling standard, and the donor model is not in adherence with the target 3D modeling standard.

3. The system of claim 1, wherein the location is a second location at the target model, wherein the first landmark indicates a first location at the donor model, and wherein the first location corresponds to the second location.

4. The system of claim 1, the one or more processors to translate, to match the first landmark and vertices surrounding the first landmark, a vertex at the location and corresponding to the target model.

5. The system of claim 1, the one or more processors to:
- generate the blendshape based on the landmark map and based on positional differences between vertices of the target model and a shape of the donor model.

6. The system of claim 1, the one or more processors to:
- compare a first shape of a compliant model with a second shape of the donor model; and
- identify, in response to a comparison between the first shape and the second shape, the compliant model as the target model.

7. The system of claim 6, the first shape of the compliant model compatible with the target 3D modeling application.

8. The system of claim 1, wherein the target model is identified based on a similarity between a first shape of the target model and a second shape of the donor model.

9. The system of claim 8, the first shape corresponding to one or more of an overall shape of the target model and a feature of the target model.

10. The system of claim 1, the one or more processors to:
- refine a first shape corresponding to the target model to more precisely match a second shape of the donor model.

11. The system of claim 1, the processor to:
- cut the dummy mesh in half;
- refine a shape corresponding to the half of the dummy mesh to more precisely match a second shape of the donor model; and
- mirror the half of the dummy mesh to generate the blendshape.

12. The system of claim 1, the one or more processors to:
- generate the landmark map based on the first landmark and the second landmark.

13. A method to refactor content corresponding to three-dimensional (3D) assets, the method comprising:
- deforming, using a blendshape that is based at least in part on a landmark map that correlates a first landmark in a donor model to a second landmark in a target model, the target model into a modified target model that adheres to a target 3D modeling standard;
- modifying, based on a determination that the donor model is incompatible with a target 3D modeling application corresponding to the target 3D modeling standard, an aspect of the target model to adhere to the target 3D modeling application;
- generating, based on the target model, a dummy mesh having the second landmark; and
- translating, to match the first landmark and vertices surrounding the first landmark, a vertex of the dummy mesh at a location at the target model, the location indicated by the second landmark, the blendshape corresponding to offsets of the dummy mesh.

14. The method of claim 13, wherein:
- the target model is in adherence with the target 3D modeling standard, and the donor model is not in adherence with the target 3D modeling standard; and
- the location is a second location at the target model, the first landmark indicates a first location at the donor model, and the first location corresponds to the second location.

15. The method of claim 13, further comprising:
- translating, to match the first landmark and vertices surrounding the first landmark, a vertex at the location and corresponding to the target model; and
- generating the blendshape based on the landmark map and based on positional differences between vertices of the target model and a shape of the donor model.

16. The method of claim 13, further comprising:
- comparing a first shape of a compliant model with a second shape of the donor model; and
- identifying, in response to a comparison between the first shape and the second shape, the compliant model as the target model.

17. The method of claim 16, the first shape of the compliant model compatible with the target 3D modeling application.

18. The method of claim 13, further comprising:

refining a first shape corresponding to the target model to more precisely match a second shape of the donor model.

19. The method of claim 13, further comprising:

cutting the dummy mesh in half;

refining a shape corresponding to the half of the dummy mesh to more precisely match a second shape of the donor model; and mirroring the half of the dummy mesh to generate the blendshape.

20. A non-transitory computer readable storage medium including one or more instructions stored thereon and executable by one or more processors to:

deform, by the one or more processors and using a blendshape that is based at least in part on a landmark map that correlates a first landmark in a donor model to a second landmark in a target model, the target model into a modified target model that adheres to a target 3D modeling standard;

modify, by the processor and based on a determination that the donor model is incompatible with a target 3D modeling application corresponding to the target 3D modeling standard, an aspect of the target model to adhere to the target 3D modeling application;

generate, based on the target model, a dummy mesh having the second landmark; and translate, to match the first landmark and vertices surrounding the first landmark, a vertex of the dummy mesh at a location at the target model, the location indicated by the second landmark, the blendshape corresponding to offsets of the dummy mesh.

* * * * *